Aug. 21, 1951　　　W. H. HARSTICK　　　2,564,899
POWER WASHING CENTRIFUGAL SEPARATOR
Filed March 20, 1948　　　2 Sheets-Sheet 1
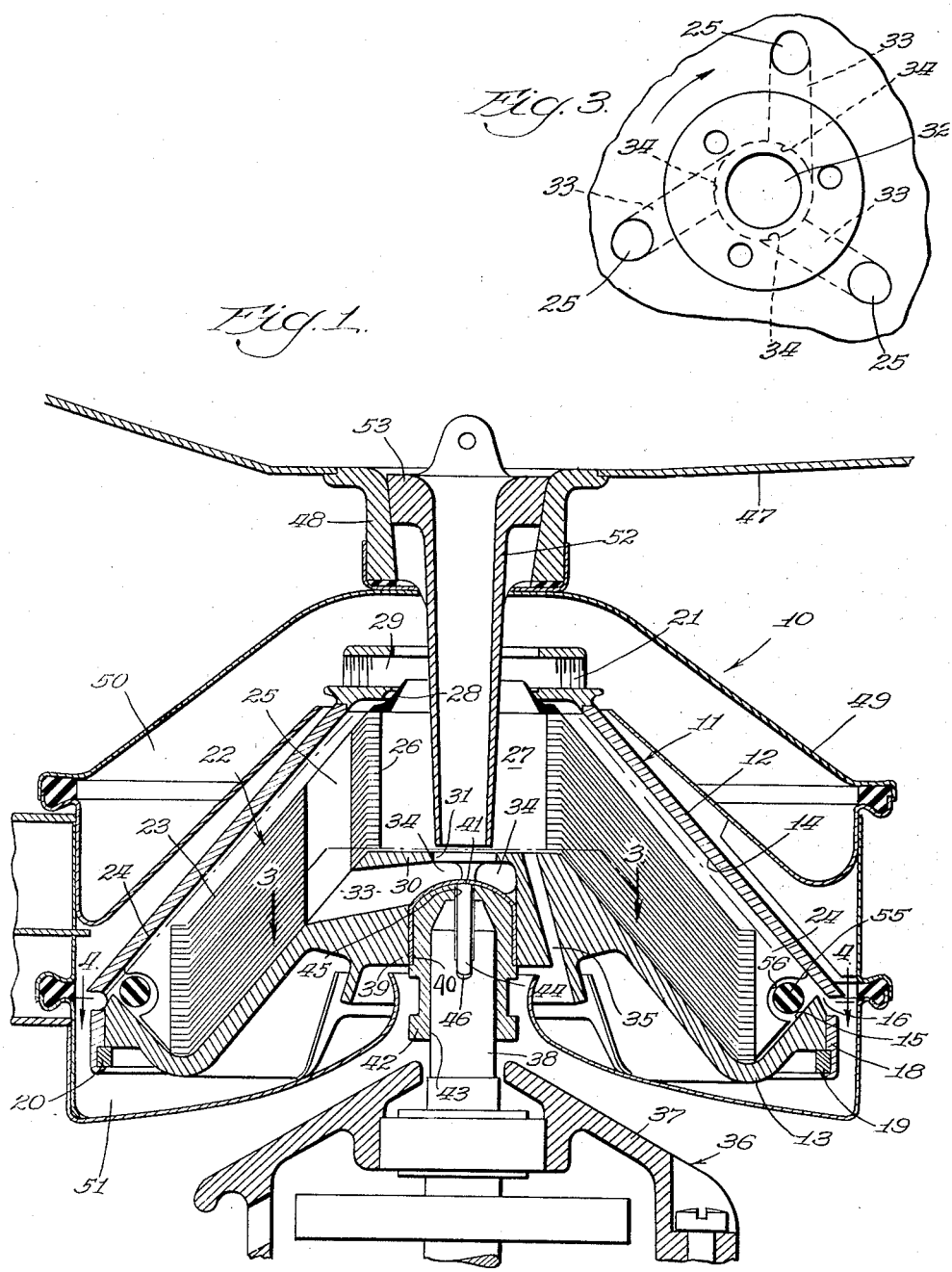
Inventor
William H. Harstick Aug. 21, 1951 W. H. HARSTICK 2,564,899
POWER WASHING CENTRIFUGAL SEPARATOR
Filed March 20, 1948 2 Sheets-Sheet 2
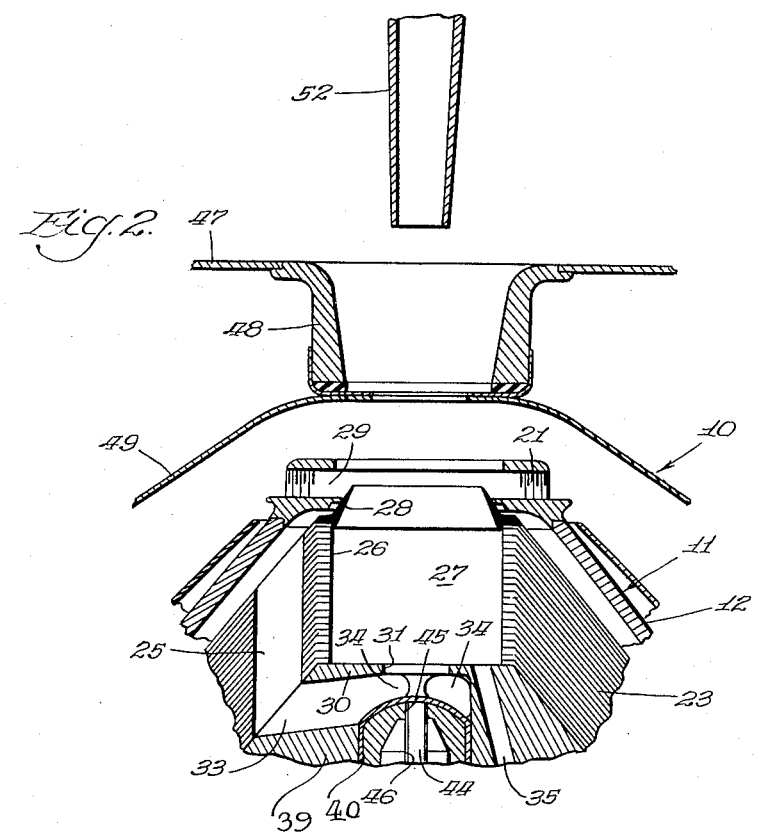
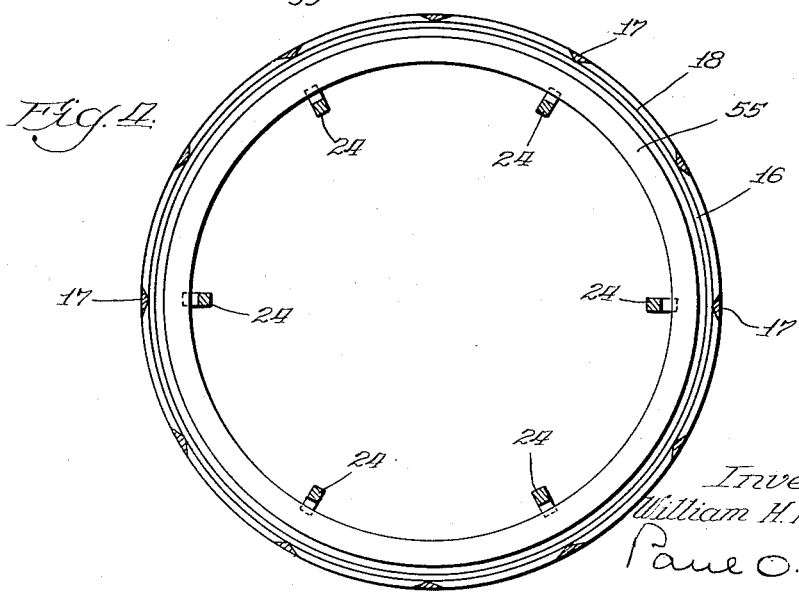
Inventor:
William H. Harstick
Paul O. Pippel
Atty.

Patented Aug. 21, 1951

2,564,899

UNITED STATES PATENT OFFICE 2,564,899

POWER WASHING CENTRIFUGAL SEPARATOR

William H. Harstick, Oak Park, Ill., assignor to International Harvester Company, a corporation of New Jersey Application March 20, 1948, Serial No. 15,997

3 Claims. (Cl. 233—20)

This invention relates to a centrifugal separator. More particularly, this invention relates to a power washing cream separator having an improved revoluble separating bowl designed to provide for greater separating efficiency.

The prime object of this invention is to provide an improved separating bowl, said bowl including a distributor chamber construction arranged to increase the efficiency of the separating operation.

Still another object is to provide an improved centrifugal bowl construction for separating whole milk, said bowl having a cylindrical distributing chamber including a plurality of outlet bores positioned tangentially to the circumference of said chamber and extending in a direction opposite to the rotation of said bowl. The position and design of said bores with relation to said chamber acting to accelerate the pick-up of milk and distribute the same to the separator disks contained within the bowl.

Still another object is to provide an improved bowl construction for a centrifugal separator, said bowl having a cylindrical distributor chamber, said chamber being positioned to receive milk from a supply can and including a convex projecting member within said chamber to direct the milk outwardly through a plurality of bores to the separating disks.

These and other objects will become apparent upon a reading of the following description when examined in conjunction with the drawings, in which:

Fig. 1 is a cross-sectional view through a centrifugal separator showing the separating bowl and parts appurtenant thereto;

Fig. 2 is a similar cross-sectional view showing a portion of the cream separating bowl having a milk feed tube removed therefrom;

Fig. 3 is a sectional view taken substantially along the line 3—3 of Fig. 1;

Fig. 4 is a view taken substantially along the line 4—4 of Fig. 1 showing a centrifugally operable valve construction for a power washing cream separating bowl.

Referring to Fig. 1, a cream separator structure is generally designated by the reference character 10. The cream separator structure includes a revoluble separating bowl 11. The separating bowl 11 is provided with an upper bowl portion 12 and a lower bowl portion 13. The upper bowl portion 12 and the lower bowl portion 13 respectively include inner sloping surfaces 14 and 15. The sloping surfaces 14 and 15 converge at the maximum periphery of the bowl at which point there is provided a continuous circumferentially extending discharge opening 16, as best shown in Fig. 4. The opening 16 is substantially continuous, being only interrupted by spacer members 17 which are secured between the upper bowl portion 12 and an annular rim 18. The annular rim 18 extends downwardly and is in telescoping relation with the lower bowl portion 13. The annular rim 18 is also provided with a circumferentially extending ring 19 which fits into an annular groove 20. The ring 19 is in abutting relation with the outer peripherial edge of the lower bowl portion 13 and serves to maintain the bowl portions in assembled relation. The upper end of the upper bowl portion 12 includes a pair of skim milk outlets 21 of conventional design.

A pack of frusto-conical separating disks 22 are enclosed within the bowl 11. The pack of frusto-conical disks includes a plurality of individual separating disks 23 which are stacked in superposed relation. The separating disks are supported at their outer peripheral edges by a plurality of downwardly extending wings 24, connected to the upper bowl portion 12.

The separating disks 23 are each provided with openings forming eccentric passages designated at 25. The inner peripheral edges of the disks are in axial alinement thereby providing a cylindrical space 27. The uppermost disk is also provided with a collar 28 which is in axial alinement with the cylindrical space 27 and an opening 29 formed in the upper end of the upper bowl portion 12.

A central portion of the lower bowl portion 13 is provided with a flat horizontal wall 30, said wall defining the lower end of the cylindrical space 27. The wall 30 is provided with an opening or vertically extending bore 31 axially positioned with respect to the cylindrical space 27. Beneath the wall 30 and in axial alinement with the opening 31, there is provided, as best shown in Fig. 3, a cylindrical distributing chamber 32. The distributing chamber 32 includes a plurality of bores 33 which are in direct communication with the passages 25 extending upwardly in the disk pack 22. As best shown in Fig. 3, the bores 33 are tangential with respect to the circumference of the cylindrical distributing chamber 32. The position of these bores is such that they extend angularly in a direction opposite to the direction of rotation of the bowl. In other words, these bores slope rearwardly in a horizontal plane with respect to the direction of rotation of the bowl during operation. By virtue of this position, each bore is provided with an oval tangential opening which is in direct communication with the cylindrical distributing chamber 32. Each tangential opening 34 is of substantially greater cross-sectional area than a vertical section taken through the bore proper. The position of these bores is of exceptional importance since the increased efficiency in the pick up of the whole milk is dependent upon this construction as will be set forth in the operation. A cream discharge outlet 35 is also provided in the lower bowl portion 13, as shown in Figs. 1 and 2.

An electric motor 36 is generally designated in Fig. 1. The electric motor 36 includes a casing 37 from which a shaft 38 projects. The lower bowl portion is provided with a central portion 39 in which a cup-shaped member 40 is securely fastened. The member 40 may be connected to the central portion 39 by means of welding, bracing or other securing methods. The upper end of the cup-shaped member 40 is provided with a convex surface which projects upwardly within the cylindrical chamber 32. Securely connected within the cup-shaped member 40 is a drive portion 42 having a bore 43. A key 44 engages a slot 45 formed in the drive portion 42. The key 44 also is in driving engagement with the shaft 38 by means of a slot 46 formed therein.

A supply can is indicated at 47. The supply can 47 includes a discharge nozzle 48 supported on a tinware construction designated at 49. The tinware construction 49 includes the usual skim milk receiving chamber 50 and cream receiving chamber 51. A milk feed tube 52 is supported within the discharge nozzle 48 and extends downwardly therefrom. The milk feed tube includes a conical collar portion or valve member 53 which cooperates with the discharge nozzle 48 for limiting the discharge of washing liquid through said nozzle. A tab 54 is connected to the upper end of the milk feed tube 52, said tab normally being utilized to suport a valve regulating arrangement not shown. This arrangement is clearly shown and described in applicant's Patent No. 2,504,261 patented April 18, 1950.

A rubber ring valve 55 is supported within the bowl by means of cutouts 56 formed in the wings 24. The ring valve 55 lies adjacent the discharge opening 16 and is adapted to centrifugally close the same depending on the speed of rotation of the separating bowl.

*The operation*

During the separating operation the milk feed tube 52 is in the position shown in Fig. 1. Whole milk descends downwardly into the tube through the opening 31 and into the distributing chamber 32. As the milk reaches the distributing chamber 32, it is immediately picked up and centrifugally distributed outwardly through the openings 33. The tangential openings 34 substantially cover the area formed by the circumferential edge of the distributing chamber 32. In the conventional type of separating bowl the distributing chamber is generally provided with radially disposed openings. In a bowl of that type the column of milk must first be brought up to a sufficiently high rotating speed before sufficient centrifugal action is present to distribute the milk outwardly of the chamber. The amount of pick-up that the distributing chamber develops, in conventional bowl construction, is therefore greatly limited. It is to be noted, however, that in applicant's device the discharge openings are so positioned that a column of milk descending into said distributing chamber is immediately picked up and centrifugally thrown outwardly through said bores. The position of the bores, and the increased area of the tangential openings 34 provides an action of the distributor which is similar to that of a centrifugal pump.

It is therefore clearly apparent that the action of the separating bowl is greatly enhanced since any milk entering the chamber is immediately thrown outwardly and greater efficiency and pick up of whole milk is occasioned by this construction. Since the bores 33 are also angularly positioned and extending in a direction opposite to the direction of rotation of said bowl, the discharge of milk through said outlets is also increased. The milk is scooped up by the rotating bores and immediately propelled through said bores and to the eccentric passages of the separating disks. The convex surface 41 of the cup-shaped member 40 also cooperates with the bores 33 to effectuate a more rapid and sufficient discharge of the whole milk. As the milk enters and strikes the rotating edges of the convex surface, increased centrifugal momentum is also imparted to the whole milk.

The separating operation of this bowl is otherwise conventional with other power washing bowls. The valve 55 is arranged to close the discharge opening 16 during high speeds of separation Skim escapes through the skim milk openings 21 and cream is discharged through the cream outlet 35.

As best shown in Fig. 2, the milk feed tube 53 is removed when it is desired to wash the bowl. Upon lowering of the rotating speed of the bowl, the valve 55 opens and permits the flushing of washing liquid through the discharge opening 16. The washing liquid enters through the supply can 47 into the cylindrical space 27. The washing liquid is then centrifugally forced outwardly between the peripheral edges of the disks. A certain amount of washing liquid is also forced downwardly into the distributor chamber 32 where it is likewise picked up and distributed through the bores 33 to the eccentric passages 25. The structure of the distributing chamber and the position of the bores 33 is thus also effective to pick up and more efficiently discharge the washing liquid, whereby the interior of the bowl parts may be more effectively flushed.

It can now be clearly seen that a more efficient cream separating bowl has been provided. By the effective and novel disposition of the bores 43 a conventional size separating bowl has thus been improved to permit a more efficient and greater capacity of separation as well as to provide a distributor chamber construction that can be completely and positively flushed.

It is to be understood that changes and modifications may be made in this construction which do not depart from the spirit of the invention as disclosed nor the scope thereof as defined in the appended claims.

What is claimed is:

1. A power washing cream separator having in combination, a rotatable separating bowl including upper and lower bowl portions, a plurality of separating disks positioned in said bowl in superposed relation, the inner edges of said disks defining a substantially cylindrical space, a milk feed tube extending into said bowl, valve means arranged at the periphery of said bowl for flushing liquid therefrom, a centrally positioned cylindrical distributor chamber formed in the lower bowl portion below the inner edge of the lowermost disk, said distributor chamber being in communication with said milk feed tube and having a plurality of narrow horizontally extending outlet bores, each bore being tangential to the circumference of the chamber and extending in a direction opposite the direction of rotation of said bowl, said lower bowl portion also having a central opening, and a driving member rigidly secured within said opening, said driving member including a cup shaped sleeve having an upper convex portion projecting upwardly into said distributor chamber, said convex portion intersecting the innermost open ends of said bores, said convex portion being rotatable with said bowl and arranged to deflect liquid outwardly through said outlet bores.

2. A cream separator having in combination a rotatable separating bowl including upper and lower bowl portions, a plurality of separating disks positioned in said bowl in superposed relation, the inner edges of said disks defining an uninterrupted substantially free cylindrical space, said disks having a plurality of openings in vertical alignment to provide axially extending passages, a milk feed tube positioned in the cylindrical space for directing liquid into said bowl, a cylindrical distributor chamber formed in the lower bowl portion, said chamber including a centrally positioned narrow vertically extending bore in axial alignment with the milk feed tube, said lower bowl portion having an opening below the distribution chamber in axial alignment with the vertically extending bore, a driving member rigidly secured within the opening, said driving member having an upper convex portion projecting upwardly into the distribution chamber, a plurality of outlet bores formed in the lower bowl portion and in communication with the vertically extending bore, each bore being tangential to the circumference of the vertically extending bore and extending in a direction opposite to the direction of rotation of said bowl, each of said bores being of substantial length and extending radially outwardly in a substantially horizontal plane to communicate with the passages for delivering liquid to the separating disks, the innermost open ends of said bores being intersected by the convex portion of said driving member whereby liquid delivered to said distribution chamber is centrifugally deflected from the convex portion in a direct radially outwardly horizontal path through the outlet bores.

3. A power washing cream separator having in combination a rotatable separating bowl including upper and lower bowl portions, a plurality of separating disks positioned in said bowl in superposed relation, the inner edges of said disks defining an uninterrupted substantially free cylindrical space, said disks having a plurality of openings in vertical alignment to provide axially extending passages, a milk feed tube positioned in the cylindrical space for directing liquid into said bowl, valve means arranged at the periphery of the bowl, said valve means being responsive to centrifugal force for discharging liquid from the bowl, a cylindrical distribution chamber formed in the lower bowl portion, said chamber including a centrally positioned narrow vertically extending bore formed in the lower bowl portion, said bore being in axial alignment with the milk feed tube, a convex portion projecting upwardly into the distribution chamber, a plurality of outlet bores formed in the lower bowl portion and in communication with the vertically extending bore, each bore being tangential to the circumference of the vertically extending bore and extending in a direction opposite to the direction of rotation of said bowl, each of said bores being of substantial length and extending radially outwardly in a substantially horizontal plane to communicate with the passages for delivering liquid to the separating disks, the innermost open ends of said bores being intersected by the convex portion of said driving member whereby liquid delivered to said distribution chamber is centrifugally deflected from the convex portion in a direct radially outwardly horizontal path through the outlet bores.

WILLIAM H. HARSTICK.

REFERENCES CITED

The following references are of record in the file of this patent:

UNITED STATES PATENTS

| Number | Name | Date |
|---|---|---|
| 989,099 | Wright | Apr. 11, 1911 |
| 1,122,457 | Wright | Dec. 29, 1914 |
| 1,277,676 | Wright | Sept. 3, 1918 |
| 1,988,002 | Flowers et al. | Jan. 15, 1935 |
| 2,173,580 | Fawcett | Sept. 19, 1939 |
| 2,319,653 | Zachariassen | May 18, 1943 |
| 2,321,144 | Jones | June 8, 1943 |
| 2,477,982 | Hintz | Aug. 2, 1949 |

FOREIGN PATENTS

| Number | Country | Date |
|---|---|---|
| 77,843 | Sweden | Aug. 6, 1932 |